United States Patent
Barrow

(10) Patent No.: US 7,574,227 B1
(45) Date of Patent: Aug. 11, 2009

(54) SYSTEM AND METHOD FOR DISPATCH CALLING USING PERSONAL TELEPHONE NUMBERS

(75) Inventor: Steven Wesley Barrow, South Riding, VA (US)

(73) Assignee: Nextel Communcations Inc., Reston, VA (US)

( * ) Notice: Subject to any disclaimer, the term of this patent is extended or adjusted under 35 U.S.C. 154(b) by 368 days.

(21) Appl. No.: 11/192,076

(22) Filed: Jul. 29, 2005

Related U.S. Application Data

(60) Provisional application No. 60/611,751, filed on Sep. 22, 2004.

(51) Int. Cl.
*H04B 7/00* (2006.01)

(52) U.S. Cl. .................... 455/518; 455/519; 370/312; 370/432

(58) Field of Classification Search ................ 455/411, 455/414.1, 426.1, 550.1, 551, 552.1, 553.1, 455/518, 519, 520, 521, 461, 404.1, 433, 455/445; 370/352, 353, 354, 355, 356, 351, 370/312, 432
See application file for complete search history.

(56) References Cited

U.S. PATENT DOCUMENTS

| | | | |
|---|---|---|---|
| 5,854,982 A * | 12/1998 | Chambers et al. ........... 455/445 |
| 6,374,091 B1 * | 4/2002 | Richards et al. ............ 455/90.1 |
| 6,662,010 B1 * | 12/2003 | Tseitlin et al. ........... 455/426.1 |
| 6,879,811 B1 * | 4/2005 | Carter et al. ............. 455/67.11 |
| 6,980,821 B2 * | 12/2005 | Balasuriya et al. .......... 455/518 |
| 7,006,491 B2 * | 2/2006 | Saeed et al. ................. 370/352 |
| 7,072,678 B2 * | 7/2006 | Allison ....................... 455/518 |
| 7,142,537 B2 * | 11/2006 | Shores et al. ............... 370/389 |
| 2002/0132635 A1 * | 9/2002 | Girard et al. ................ 455/552 |
| 2003/0207690 A1 * | 11/2003 | Dorenbosch ................ 455/445 |
| 2004/0127251 A1 * | 7/2004 | Thakkar et al. .......... 455/552.1 |
| 2005/0153744 A1 * | 7/2005 | Desai et al. ................. 455/560 |
| 2006/0019698 A1 * | 1/2006 | Ahya et al. .............. 455/552.1 |

* cited by examiner

*Primary Examiner*—Charles N Appiah
*Assistant Examiner*—Olumide T Ajibade Akonai

(57) ABSTRACT

A method and system for dispatch calling using personal telephone numbers (PTNs) are provided. In accordance with the method and system, when a dispatch user enters a PTN as part of a dispatch call initiation, the originating dispatch call controller recognizes that the dispatch call request includes a PTN. If the originating dispatch call controller does not have the target subscriber in its recent call record cache, the originating call controller determines which home location registers (HLRs) serve subscribers with the particular NPA and NXX of the PTN. The originating call controller sends a request for the UFMI of the target subscriber to each of the determined HLRs. When the originating call controller receives a response from one of the HLRs with the UFMI, the originating call controller completes the dispatch call using the received UFMI.

6 Claims, 2 Drawing Sheets

The remaining steps follow standard iDEN Protocol
to complete the Dispatch "Private Call"

SYSTEM AND METHOD FOR DISPATCH CALLING USING PERSONAL TELEPHONE NUMBERS

CROSS-REFERENCE TO RELATED APPLICATIONS

This application claims the benefit of U.S. Provisional Application No. 60/611,751, filed Sep. 22, 2004, the entire disclosure of this application is herein expressly incorporated by reference.

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly known as a talk or walkie-talkie type of call such as Nextel's service identified by the trade name Direct Connect.

One type of network which provides interconnect and dispatch communication services is the iDEN network. In the iDEN network an Urban, Fleet Member ID (UFMI) is used for dispatch calls and a Personal Telephone Number (PTN) is used for interconnect calls. The PTN corresponds to a conventional telephone number. Accordingly, each iDEN subscriber that uses both interconnect and dispatch communication services will be assigned a unique UFMI and PTN. Dispatch communication services can only be performed using a UFMI, and interconnect communication services can only be performed using a PTN.

SUMMARY OF THE INVENTION

A method and system for dispatch calling using personal telephone numbers (PTNs) are provided. PTNs are made up of a Number Planning Area (NPA), commonly known as an area code, a Numeric Number Exchange (NXX) which is also known as a prefix or central office code, and the final four digits of the PTN known as the line number. The format of PTNs is NPA-NXX-XXXX. In accordance with the present invention, when a dispatch user enters a PTN as part of a dispatch call initiation, the originating dispatch call controller recognizes that the dispatch call request includes a PTN. If the originating dispatch call controller does not have the target subscriber in its recent call record cache, the originating call controller determines which home location registers (HLRs) serve subscribers with the particular NPA and NXX of the PTN. The originating call controller sends a request for the UFMI of the target subscriber to each of the determined HLRs. When the originating call controller receives a response from one of the HLRs with the UFMI, the originating call controller completes the dispatch call using the received UFMI.

Other objects, advantages and novel features of the present invention will become apparent from the following detailed description of the invention when considered in conjunction with the accompanying drawings.

DETAILED DESCRIPTION OF THE EXEMPLARY EMBODIMENTS

In accordance with exemplary embodiments of the present invention, iDEN subscribers can initiate a dispatch private call to another iDEN subscriber using the target's PTN. In order to allow such functionality, a number of changes and additions are required to the iDEN network. A new field in the iHLR's subscriber table which would allow the iDEN service provider to add a subscriber's PTN into the iHLR is required. A global title translation table tool (EGT4) identifies NPA and NXX ranges to specific iHLRs, which are then to be used by the iDEN dispatch call controller (i.e., the dispatch application processor (DAP)) when it performs a global title translation (GTT) lookup.

Figure 2:
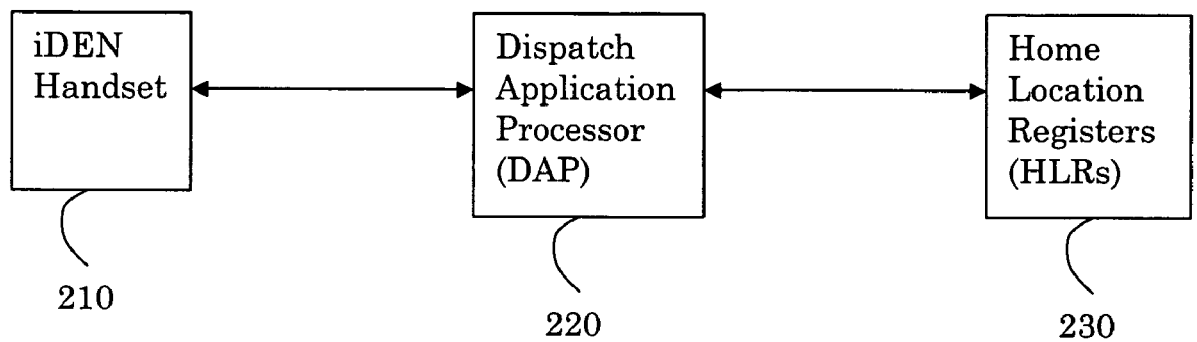
FIG. 2 illustrates an exemplary system for dispatch calling using a Personal Telephone Number (PTN) in an iDEN network.

In addition, the iDEN handset 210, which is illustrated in FIG. 2, needs to recognize when an iDEN subscriber initiates a dispatch call using a PTN. Currently, if a user attempts to initiate a dispatch private call using a PTN, some iDEN handsets will treat an entered PTN as a UFMI in a 3-4-3 format. For example, the PTN of 703-930-9466, will be treated by the iDEN handset as a UFMI of 703*9309*466. The current iDEN network does support the ability to send a PTN in the "Private Call Request" which is initiated by the iDEN handset, received by the iDEN cell site and forwarded to the iDEN dispatch call controller.

An iDEN "Private Call Request" reserves 40 bits for the Target UFMI, 2 bits for the USI (Urban Size Indicator) and 3 bits for the FSI (Fleet Size Indicator). The remaining 35 bits are reserved for the UFMI encoding or PTN encoding. As per iDEN protocol, when the "Private Call Request" contains a USI value of 0x11 and an FSI value of 0x1xx, it indicates that the target's UFMI is a PTN, therefore 37 bits are reserved for a PTN. For a North American PTN, only 34 bits are required as illustrated below:

NPA ranges (000-999): requires 10 bits ($2^{10}=1,024$)

NXX ranges (000-999): requires 10 bits ($2^{10}=1,024$)

Line Number (0000-9999): requires 14 bits ($2^{14}=16384$)

Figure 1:
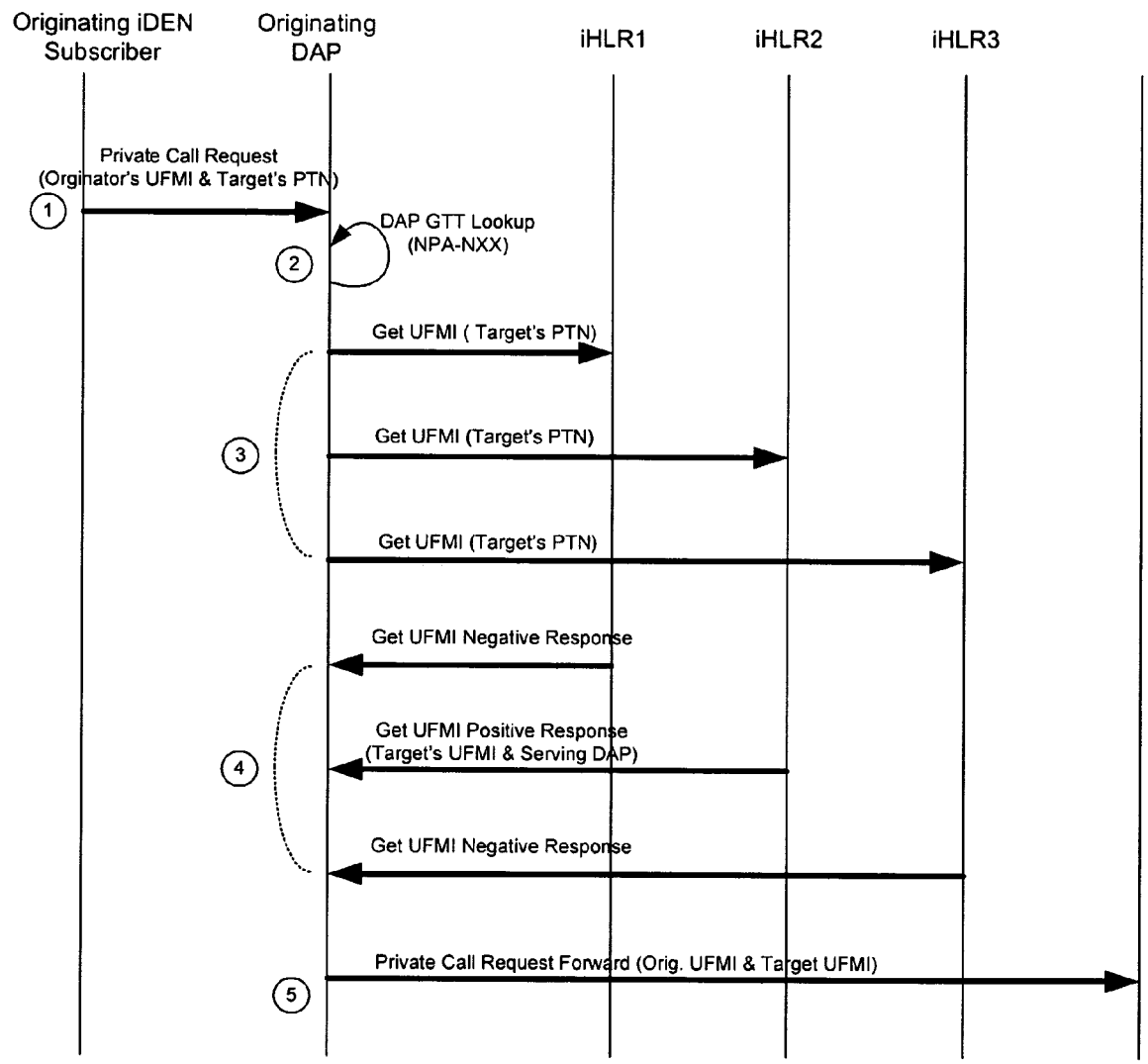
FIG. 1 illustrates exemplary signaling for initiating a dispatch call using a personal telephone number (PTN) in an iDEN network.

FIG. 1 illustrates exemplary signaling for initiating a dispatch call using a personal telephone number (PTN) in an iDEN network. It should be noted that steps 1-4 are new iDEN messages and step 5 corresponds to standard iDEN call procedures, with the exception of the DAP storing the target iDEN subscriber's PTN in the recent call record cache.

Step 1: The originating iDEN Subscriber initiates a dispatch private call to the target iDEN subscriber using the target's PTN (NPA-NXX-XXXX). The originating iDEN 210 handset forwards the standard iDEN "Private Call Request" to the originating DAP 220 (via the iDEN cell site) with the USI value as 0x11, the FSI value as 0x1xx and the PTN encoded in the remaining 35 bits reserved for the UFMI.

Step 2: Upon receipt of the dispatch "Private Call Request" from the originating iDEN handset 210 (via the iDEN cell site), illustrated in FIG. 2, the originating DAP 220 identifies that the "Private Call Request" is using the target's PTN via the values of the USI and FSI fields in the "Private Call Request" (i.e., USI=0x11 and FSI=0x1xx). Assuming that the originating DAP 220 does not find the target iDEN subscriber in it's recent call record cache or visitor location record (VLR), the originating DAP 220 performs a GTT lookup using the NPA and NXX of the PTN provided in the "Private Call Request" to determine which iHLRs serve iDEN subscribers with the NPA and NXX, and to determine the target iDEN subscriber's UFMI.

Step 3: Based on the GTT information, the originating DAP 220 sends a "Get UFMI" request, which contains the target's PTN, to each iHLR in the iDEN network that serves the target's NPA-NXX.

Step 4: Each iHLR 230 that receives the "Get UFMI" request from the originating DAP 220 performs a database lookup to determine if the iHLR 230 serves the target iDEN subscriber. If the iHLR 230 does not serve the target iDEN subscriber, then the iHLR 230 will forward a "Get UFMI Negative Response" back to the originating DAP 220. If the iHLR 230 serves the target iDEN subscriber, then the iHLR 230 will forward a "Get UFMI Positive Response" back to the originating DAP 220. The "Get UFMI Positive Response" will also include the target iDEN subscriber's UFMI and serving DAP ID.

If an iDEN subscriber chooses not to be contacted via PTN, then the iDEN service provider does not enter a PTN for the subscriber in the iHLR's subscriber table. This would result in all of the iHLRs responding to the originating DAP 220 with a "Get UFMI Negative Response." Upon the originating DAP 220 receiving a "Get UFMI Negative Response" from all the iHLRs 230 that were queried, the originating DAP 220 responds back to the originating iDEN Subscriber with an error message consistent with "Invalid Entry" or "Target Not Authorized."

Step 5: Upon receipt of a "Get UFMI Positive Response" from the iHLR 230, the originating DAP 220 forwards, as per standard iDEN call procedures, a "Private Call Request Forward" to the target's DAP. The originating DAP 220 and the target DAP continue to follow standard iDEN call procedures to establish the dispatch private call between the two users. As per standard iDEN call procedures, the originating DAP 220 will store in its recent call record cache the target's UFMI and DAP ID, and it will also store in its recent call record cache the target's PTN and DAP ID.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substances of the invention may occur to persons skilled in the art, the invention should be construed to include everything within the scope of the appended claims and equivalents thereof.

What is claimed is:

1. In an iDEN network, a method for dispatch calling using a personal telephone number (PTN), the method comprising the acts of:
   receiving a dispatch call request with the PTN;
   determining which home location registers serve subscribers associated with a portion of the PTN;
   querying the determined home location registers for an Urban, Fleet Member ID (UFMI);
   completing the dispatch call using a UFMI received from one of the determined home location registers,
   wherein the act of determining which home location registers serve subscribers associated with the portion of the PTN comprises the acts of:
   querying a recent call record cache and a visitor location record; and
   performing a global title translation (GTT) lookup, based on the portion of the PTN, if the querying of the recent call record cache and the visitor location record do not indicate which home location registers serve subscribers associated with the portion of the PTN.

2. The method of claim 1, wherein an error message is output, if the UFMI is not received from the determined home location registers.

3. The method of claim 2, wherein the error message comprises one of "invalid entry" and "target not authorized."

4. The method of claim 1, further comprising:
   entering the PTN in a subscriber table of the determined home location register.

5. The method of claim 1, further comprising:
   storing the PTN in a recent call record cache contained in a dispatch call controller.

6. The method of claim 1, wherein the portion of the PTN comprises an area code and a prefix of the PTN.

* * * * *